UNITED STATES PATENT OFFICE 2,613,132

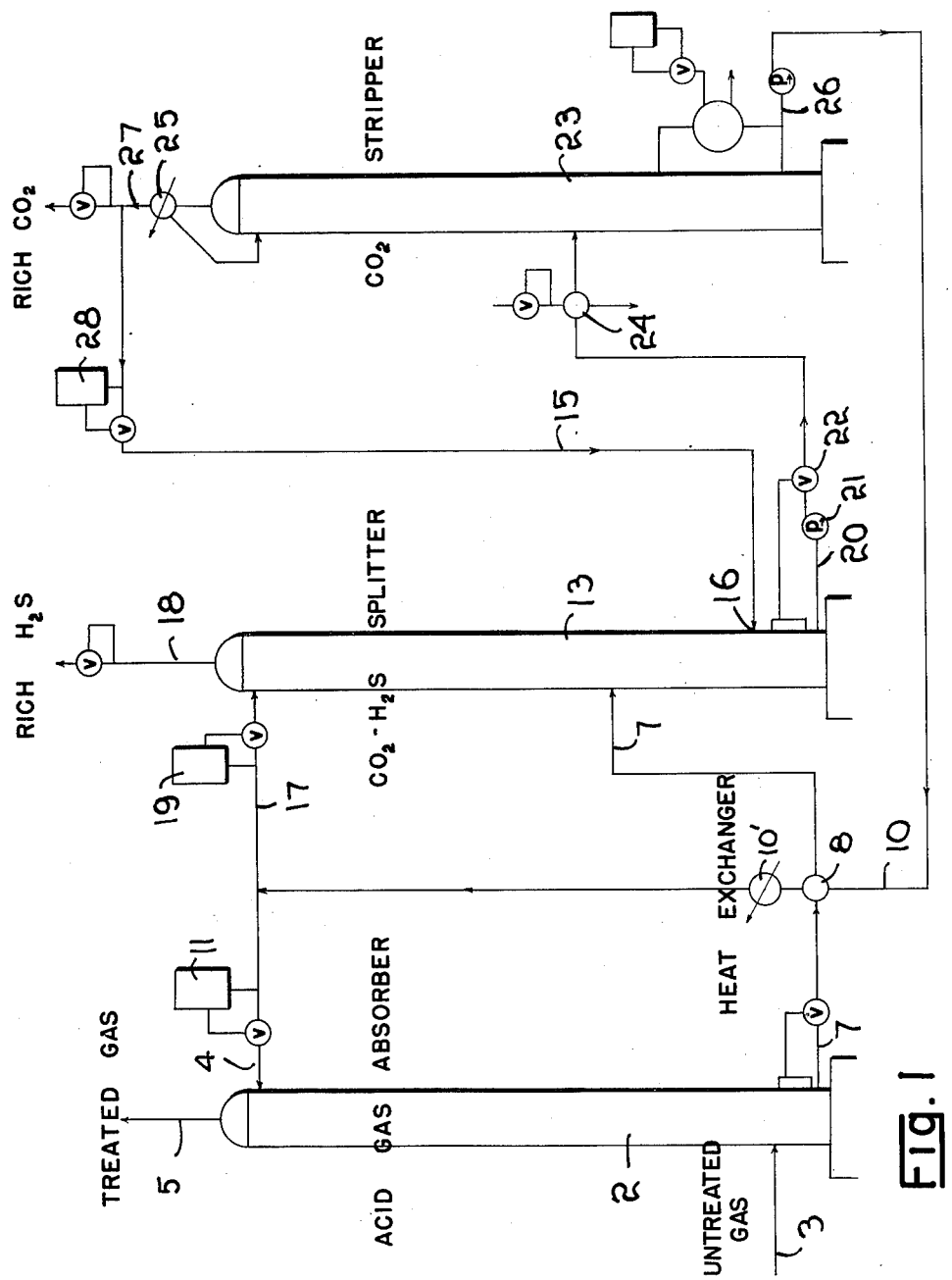

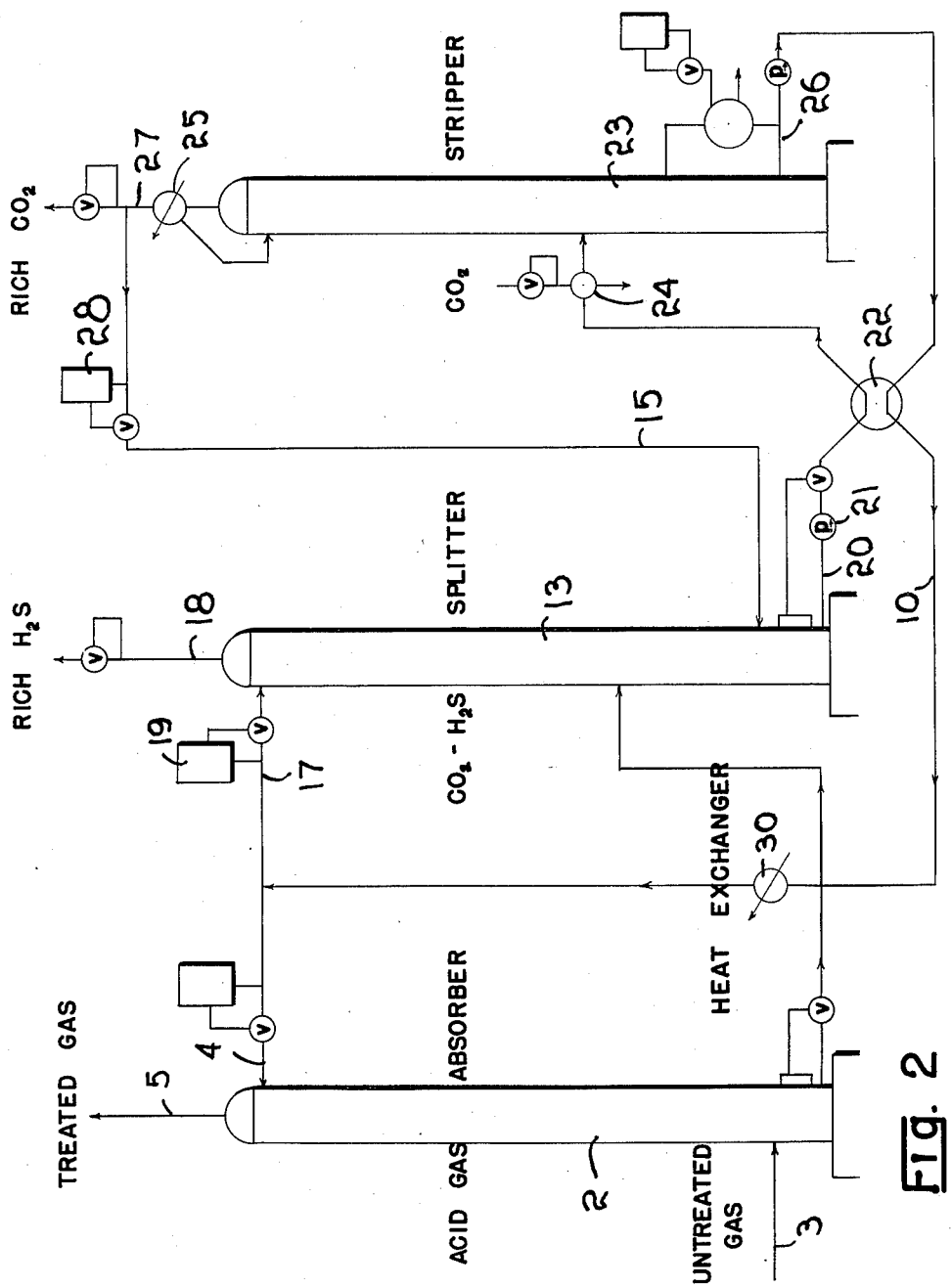

PROCESS FOR SELECTIVE SEPARATION OF ACIDIC GASES

Arthur J. L. Hutchinson, Houston, Tex., assignor to Fish Engineering Corporation, Houston, Tex., a corporation of Delaware Application April 21, 1949, Serial No. 88,788

8 Claims. (Cl. 23—2)

The invention relates generally to an improved process for treating gaseous mixtures containing acid gases and more particularly the invention relates to the separation of such acid gases from a gaseous mixture and the selective separation of the acid gases into its components.

In the processing of gaseous mixtures it is desirable to remove therefrom certain constituents which exercise certain harmful effects, for example acid gases contained in the gaseous mixture reduce the heat value of such gas and attacks the pipes and equipment through which the gas may be transmitted causing disintegration of the lines and equipment. The principal constituents of acidic gases are hydrogen sulphide and carbon dioxide and while it is assumed that the terms "acid gases" or "acidic gases" are known in the art, by way of explanation it may be stated that this group generally includes those gases which in a water solution have an acid reaction but which are released unchanged upon sufficient heating of the water.

Various methods have been proposed in the past for selectively separating such acid gases from a gaseous mixture; however, it is the primary purpose of this invention to describe a process for not only separating such acid gases from a gaseous mixture but also to selectively separate the constituents of the acid gases into its componenet parts by a relatively simple and economical procedure.

An object, therefore, of the instant invention is to selectively separate the components of an acid gas.

Another object of the invention is to separate acidic gases from a gaseous mixture and thereafter to selectively separate the components of the acidic gases from each other.

Another object of the invention is to treat a gaseous mixture with an absorbing medium to separate acidic gases therefrom and to selectively separate the components of the acid gas from each other and from the absorbing medium.

Still another object of the invention is to contact a gaseous mixture with an absorbent to reduce the moisture content of such mixture and also acid gases to a high degree of separation and to thereafter, selectively separate the absorbed moisture content and acid gases from the absorbent and to return the absorbent to the system.

A still further object of the invention is to reduce the moisture content of a gaseous mixture and to remove substantially all of the acid gases from such including hydrogen sulphide and carbon dioxide mixture by contacting an absorbent with the mixture and to thereafter selectively separate the hydrogen sulphide from the carbon dioxide and absorbent by stripping the hydrogen sulphide therefrom with a quantity of carbon dioxide passed through the absorbent.

Yet a further object of the invention is to provide an economical process for the production of odorless, high purity carbon dioxide gas from waste gases.

A further object of the invention is to treat a gaseous mixture with an absorbing medium to separate acidic gases therefrom, to selectively separate the components of the acid gas from each other and from the absorbing medium and then return the regenerated absorbing medium to the system for further treatment of additional quantities of gaseous mixtures containing acid gases.

Other and further objects and advantages of the invention will become more apparent from a consideration of the following description and drawing, wherein:

Fig. 1 illustrates a typical method and form of apparatus for carrying out the process; and Fig. 2 illustrates an alternate embodiment of such method and apparatus.

In the drawing the numeral 2 indicates an absorber supplied with gas coming from the line 3. The absorber 2 may be of any suitable type and construction capable of effecting intimate contact between the rising gas stream and the downwardly flowing acid gas removal agent being introduced into the upper interior of the absorber through line 4. The treated gas with the acidic gases removed therefrom may be ejected from the absorber through the line 5 for further treatment if desired.

The absorbing medium introduced through the line 4 may consist of a polyhydric alcohol and an amine as disclosed in my Patent No. 2,177,068 issued October 24, 1939 on "Process for Treating Gases" if it is desired to remove not only the acid gases from the gas mixture but to substantially reduce the moisture content thereof. Such absorbing medium may be of the type as that disclosed in the patent to Robert Roger Bottoms, Re. 18,958 reissued September 26, 1933 on "Process for Separating Acidic Gases," which absorbing solution is described therein as including an amine selected from the group consisting of aliphatic and cycloparaffin amines, and which is free from carboxyl or carbonyl groups, and which has a boiling point not substantially below 100° C. While either type absorbent may be used to obtain satisfactory results, if the gaseous mixture being treated contains an undesirable amount of moisture, the glycol-amine absorbent would be used in preference to Bottoms amine absorbent, so as to substantially remove or reduce the moisture content from the gas mixture.

The absorbing medium containing the carbon dioxide and hydrogen sulphide is drawn off the bottom of the gas absorber through the line 7 and is passed to the heat exchanger 8 where such solution is heated by heat transfer with hot fresh absorbing solution passing through the line 10. The heat exchanger 8 serves to heat the absorbing medium and acid gases contained therein while simultaneously cooling the absorbing medium passing through the line 10 and line 4 to the acid gas absorber. If desired, additional cooling may be supplied to the absorbing solution by means of the heat exchanger 10'.

If desired a suitable flow rate control as illustrated at 11 may be utilized in the line 4 to regulate the flow of absorbing solution to the acid gas absorber.

The absorbing solution and carbon dioxide-hydrogen sulphide contained therein are passed from the heat exchanger 8 through the line 7 into the carbon dioxide-hydrogen sulphide splitter 13. In order to selectively separate the hydrogen sulphide gas from the carbon dioxide and the absorbing solution, relatively pure carbon dioxide is supplied through the line 15 to the base of the tower 13 as shown at 16. The carbon dioxide gas thus injected into the tower 13 strips, or replaces the hydrogen sulphide gas from the absorbing solution. The gases rising in the top of the carbon dioxide-hydrogen sulphide splitter tower 13 are scrubbed countercurrently with fresh absorbing solution which passes through the line 17 and into the top of the tower. Such absorbing solution serves to remove substantially all of the carbon dioxide gas from the upwardly passing gas stream whereby relatively pure hydrogen sulphide gas is ejected from the tower to the line 18.

The purity of the hydrogen sulphide gas ejected from the tower 13 may vary depending upon desired operating conditions, however, it is desirable that the hydrogen sulphide be at least rich enough to burn. Also if it is desired to obtain a high purity of odorless carbon dioxide from tower 23, the relationship between the hydrogen sulphide and carbon dioxide out of tower 13 will be retained at a safe margin so that no hydrogen sulphide will pass to the tower 23 with the carbon dioxide gas and absorbent through line 20. This relationship is, of course, maintained by the quantity of solvent washing the hydrogen sulphide stream and the amount of carbon dioxide added at the base of tower 13. Generally, enough carbon dioxide is added to displace, for all practical purposes, all hydrogen sulphide from the solvent. The quantity of fresh solvent countercurrently washing the displaced hydrogen sulphide is in an amount to at least remove any carbon dioxide which may have passed upwardly therewith. Larger quantities of solvent would, of course, absorb the hydrogen sulphide being washed, which would subsequently be again displaced in the bottom of the tower 13 by the carbon dioxide. Hence, a recycling effect is set up in the tower.

If desired a suitable flow control device as illustrated at 19 may be used to regulate the flow of absorbing solution to the top of the tower 13. The absorbing solution and carbon dioxide contained therein are passed from the bottom of the tower 13 through the line 20, pump 21 and valve 22 to the carbon dioxide stripper 23. A preheater 24 may be positioned in the line 20 to preheat the carbon dioxide and absorbing solution passing to the tower 23 if desired.

The carbon dioxide stripper or tower 23 is operated at a pressure sufficient to recirculate the carbon dioxide gas evolved in tower 23 back through the hydrogen sulphide tower. The tower 23 may be supplied with a reboiler and overhead condenser 25 as in any conventional distillation tower.

The absorbing medium or absorbent is passed from the base of the tower 23 through the line 26 and injected back to the system. It is to be noted that the process not only serves to selectively separate the components of an acid gas but also serves to regenerate the absorbing medium or absorbent solution utilized in the process. Of course, additional absorbent may be injected into the system if any losses of the original absorbing solution occurs.

The carbon dioxide gas issuing from the top of the tower through the line 27 is relatively pure. If desired, a suitable flow control device 28 may be used to regulate the flow of carbon dioxide to the tower 13.

It is not believed necessary to go into detailed description of the apparatus used in the process since such units are well known in the art for each particular function and any suitable absorber and distillation tower construction can be used in practicing the invention without departing from the scope thereof.

As illustrated in Fig. 2, a gaseous mixture containing acid gases such as hydrogen sulphide and carbon dioxide is injected into the acid gas absorber 2 from the line 3.

An absorbing medium such as that disclosed in connection with Fig. 1 may be injected through the line 4 to countercurrently contact the gaseous mixture rising through the tower. Such absorbing medium serves to remove the acid gases such as hydrogen sulphide and carbon dioxide therefrom whereby a gas substantially free from such acid gases is ejected from the top of the tower through the line 5. The absorbing solution containing the carbon dioxide and hydrogen sulphide is passed to the tower 13 where the hydrogen sulphide is separated from the carbon dioxide and absorbing solution. In order to effect removal of the hydrogen sulphide, carbon dioxide is injected into the tower 13 at the base thereof through the line 15 while the rising gas in the tower is washed countercurrently by the absorbing solution passing through the line 17 into the top of the tower. Such absorbing solution serves to remove substantially all of the carbon dioxide from the rising gas stream whereby relatively pure hydrogen sulphide is ejected from the tower through the line 18. If desirable a suitable flow rate control 19 may be used to regulate the quantity of absorbing solution passing from the line 17 into the tower 13.

The absorbing solution containing carbon dioxide gas is ejected from the tower 13 to the line 20 and the pump 21 and then through a heat exchanger 22 through which hot absorbing solution is passed through the line 10 to the acid gas absorber. Such exchanger serves to remove the heat from the absorbing medium solution and to supply heat to the absorbing solution and carbon dioxide absorbed therein passing to the tower 23.

If desired, additional heat may be supplied to such solution prior to its entry into the tower by any suitable means such as the preheater illustrated at 24. The carbon dioxide gas is removed from the absorbing solution and passed out the top of the tower while the regenerated absorbing solution is withdrawn from the base of the tower through the line 26 and returned to the system. The tower 23 is equipped with a reboiler and overhead condenser as illustrated at 25 as in any conventional distillation tower. The carbon dioxide gas is passed from the top of the tower through the line 27; if desired, a suitable automatic flow rate control device 28 similar to that shown at 19, may be used to regulate the flow of carbon dioxide gas to the tower 13.

The absorbing solution passing from the heat exchanger 22 through the line 10 may be further cooled, if desired, by the heat exchanger 30.

From the foregoing description it can be readily seen that the invention provides a simple and economical process for removing acidic gases from a gaseous mixture and thereafter treating the acidic gases so as to separate such gas into its component parts and to return a regenerated absorbing solution to the system. Of course, until the system is in operation long enough to produce its own carbon dioxide, it may be necessary to supply carbon dioxide to the tower 13 from an independent source to begin the separation of the hydrogen sulphide.

It is to be noted that if any absorbent such as that disclosed in my Patent No. 2,177,068 is used in the system of either Figure 1 or Figure 2, then any moisture content removed from the gas stream will pass through the system and be ejected with the carbon dioxide. If pure carbon dioxide is desired, then the water and carbon dioxide may be separated by any of a number of well known methods.

Broadly the invention contemplates a method for substantially removing acidic gases from a gaseous mixture and then selectively separating one of the components of the acidic gas from the absorbent by subjecting the acidic gases and absorbent to a stream of one of the components to separate such component from the absorbing medium, and thereafter separating the remaining acid gas component from the absorbent and returning the regenerated absorbent to the system.

What is claimed is:

1. A method of treating a gaseous mixture containing acidic gases such as hydrogen sulphide and carbon dioxide comprising the steps of, contacting said gas with an absorbent that is composed of a polyhydric alcohol and an aliphatic amine to simultaneously separate the hydrogen sulphide and carbon dioxide from the mixture, treating the solution of absorbent, hydrogen sulphide and carbon dioxide by passing a stream of relatively pure carbon dioxide gas therethrough to remove hydrogen sulphide and countercurrently washing the hydrogen sulphide with fresh absorbent solution and thereafter separating the carbon dioxide from the absorbent.

2. A method of treating a gaseous mixture containing acidic gases such as hydrogen sulphide and carbon dioxide comprising the steps of, contacting said gas with an absorbent that is composed of a polyhydric alcohol and an aliphatic amine to simultaneously separate the hydrogen sulphide and carbon dioxide from the mixture, treating the solution of absorbent, hydrogen sulphide and carbon dioxide by passing a stream of relatively pure carbon dioxide gas therethrough to remove hydrogen sulphide and countercurrently washing the hydrogen sulphide with fresh absorbent solution, separating the carbon dioxide from the absorbent, and injecting the regenerated absorbent back to the system.

3. A method of treating a gaseous mixture containing acidic gases such as hydrogen sulphide and carbon dioxide comprising the steps of, contacting said gas with an absorbent from the group consisting of aliphatic and cycloparaffin amines and which is free from carboxyl or carbonyl groups and which has a boiling point not substantially below 100° C. to simultaneously separate the hydrogen sulphide and carbon dioxide from the mixture, treating the solution of absorbent, hydrogen sulphide and carbon dioxide by passing a stream of relatively pure carbon dioxide gas therethrough to remove hydrogen sulphide and countercurrently washing the hydrogen sulphide with fresh absorbent solution, and thereafter separating the carbon dioxide from the absorbent.

4. A method of treating a gaseous mixture containing acidic gases such as hydrogen sulphide and carbon dioxide comprising the steps of, contacting said gas with an absorbent from the group consisting of aliphatic and cycloparaffin amines and which is free from carboxyl or carbonyl groups and which has a boiling point not substantially below 100° C. to simultaneously separate the hydrogen sulphide and carbon dioxide from the mixture, treating the solution of absorbent, hydrogen sulphide and carbon dioxide by passing a stream of relatively pure carbon dioxide gas therethrough to remove hydrogen sulphide and countercurrently washing the hydrogen sulphide with fresh absorbent solution, separating the carbon dioxide from the absorbent and injecting the regenerated absorbent back to the system.

5. A method of producing odorless, relatively pure carbon dioxide from acidic gases including hydrogen sulphide and carbon dioxide simultaneously separated with an absorbent with which the acidic gases are chemically combined from a gaseous mixture comprising the steps of, treating the solution of absorbent, hydrogen sulphide and carbon dioxide with a controlled volume of relatively pure carbon dioxide to remove substantially all of the hydrogen sulphide, and thereafter denuding the absorbent of carbon dioxide.

6. In a method of selectively separating the components of an acidic gas mixture including hydrogen sulphide and carbon dioxide which gas has been separated from a system with a solvent with which the hydrogen-sulphide and carbon dioxide are chemically combined, the steps comprising, injecting carbon dioxide into the mixture to liberate any hydrogen sulphide therefrom, and washing the liberated hydrogen sulphide stream with regenerated solvent in a quantity to substantially remove carbon dioxide therefrom.

7. A method of treating a mixture of a solvent which is chemically combined with carbon dioxide and hydrogen sulphide comprising the steps of, flowing a controlled volume of carbon dioxide through the mixture to displace hydrogen sulphide therefrom, and simultaneously washing the hydrogen sulphide with regenerated solvent to remove carbon dioxide therefrom, the wash solution becoming a part of the mixture whereby any hydrogen sulphide picked up by such washing will be displaced by the flow of carbon dioxide.

8. A method of treating a mixture including a solvent which is chemically combined with carbon dioxide and hydrogen sulphide comprising the steps of, flowing carbon dioxide through the mixture to displace the hydrogen sulphide therefrom, simultaneously washing the hydrogen sulphide with regenerated solvent to remove carbon dioxide therefrom, separating the carbon dioxide from the solvent, and returning the regenerated solvent to the system.

ARTHUR J. L. HUTCHINSON.

REFERENCES CITED

The following references are of record in the file of this patent:

UNITED STATES PATENTS

| Number | Name | Date |
|---|---|---|
| 1,422,183 | Curme | July 11, 1922 |
| 1,598,985 | Petit | Sept. 7, 1926 |
| 2,083,213 | Baehr | June 8, 1937 |
| 2,094,070 | Hultman et al. | Sept. 28, 1937 |
| 2,161,663 | Baehr | June 6, 1939 |
| 2,177,068 | Hutchinson | Oct. 24, 1939 |
| 2,399,142 | Reed | Apr. 23, 1946 |

FOREIGN PATENTS

| Number | Country | Date |
|---|---|---|
| 467,644 | Great Britain | June 21, 1937 |
| 470,440 | Great Britain | Aug. 16, 1937 |